Feb. 2, 1932. P. D. THROPP ET AL 1,843,850
TIRE MAKING MACHINE
Original Filed Jan. 13, 1923 3 Sheets-Sheet 1

INVENTORS

Feb. 2, 1932. P. D. THROPP ET AL 1,843,850
TIRE MAKING MACHINE
Original Filed Jan. 13, 1923   3 Sheets-Sheet 2

INVENTORS

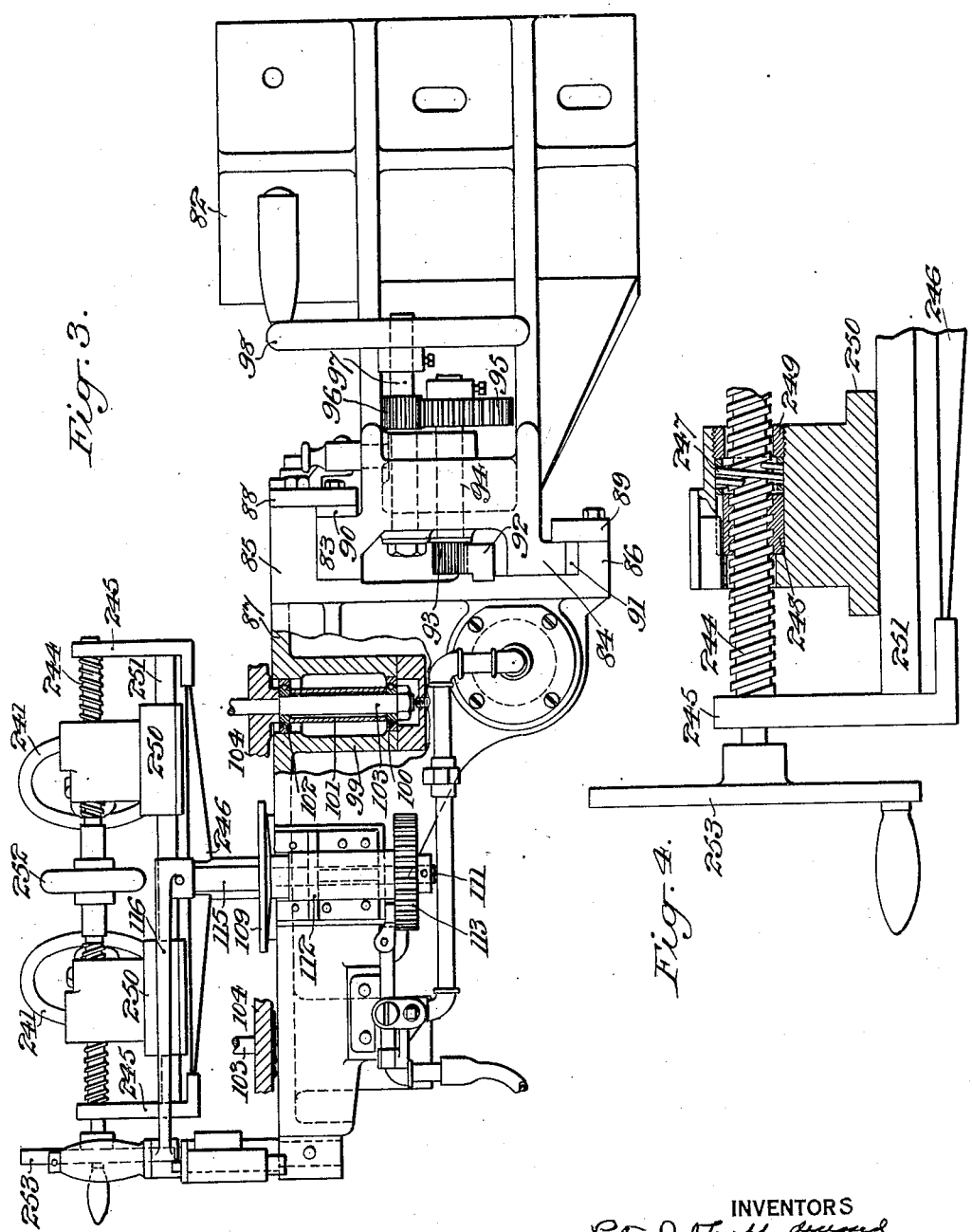

Patented Feb. 2, 1932

1,843,850

UNITED STATES PATENT OFFICE

PETER D. THROPP, DECEASED, LATE OF TRENTON, NEW JERSEY, BY CHARLOTTE M. THROPP, COEXECUTRIX, OF TRENTON, NEW JERSEY, AND LESTER A. MORELAND, OF TRENTON, NEW JERSEY, ASSIGNORS TO THE DE LASKI & THROPP CIRCULAR WOVEN TIRE COMPANY, OF TRENTON, NEW JERSEY, A CORPORATION OF NEW JERSEY

TIRE-MAKING MACHINE

Original application filed January 13, 1923, Serial No. 612,553. Patent No. 1,721,842, dated July 23, 1929. Divided and this application filed December 27, 1928. Serial No. 328,771.

This invention relates to a tire making machine of that class in which the material is laid or spun on a rotating core, and has for an object to provide such a machine that includes an improved mounting and arrangement of mechanism for forming both the fibrous material and rubber elements of the tire.

Another object consists in providing such a machine in which forming elements for the fibrous material and forming elements for the tread rubber are mounted on a support which is radially movable with respect to the core, and in which the mounting and arrangement of the said forming elements is such as to facilitate their combined functions of forming the whole tire.

Another object consist in providing certain improvements in the form, construction and arrangement of the several parts whereby the above named and other objects may be effectively attained.

The present application is a divison of application filed in the names of Peter D. Thropp and Lester A. Moreland, under date of January 13, 1923, Serial No. 612,553, Patent No. 1,721,842.

A practical embodiment of the invention is represented in the accompanying drawings in which Fig. 1 represents a plan view of a portion of the machine, showing the mechanism for applying the fibrous material and tread rubber to the core on which the tire is built.

Fig. 3 represents a detail end view of the same, with the mechanism for applying the fibrous material removed, and Fig. 4 represents a detail section, partly in elevation, on an enlarged scale, of the means for actuating the tread applying rollers.

This machine constitutes an improvement on the general type of machine shown in United States Letters Patent to John E. Thropp, Peter D. Thropp and Albert De Laski, No. 1,119,326, dated December 1, 1914.

If it is desired to make so-called "fabric" tires, that is, tires of which the fibrous body portion is composed of square woven fabric, such as duck or canvas, which has been impregnated with rubber, the same may be supplied to the machine by mechanism such as that shown and described in the said Patent No. 1,119,326, it being understood that the said mechanism can be carried by the stanchion 48 as described in said patent. During this supplying of the fabric to the core, the latter is preferably rotated at slow speed, as described in said prior patent. If, on the other hand, it is desired to make so-called "cord" tires on the machine, the layers or strips of parallel cords impregnated with rubber would be supplied to the core in band formation, as is well understood in the art. In either case, the core is circumferentially embraced by one or more strips of fibrous material which adhere to the periphery and the side edges of which are intended to be shaped or formed down onto the sides of the core, as is also well understood in the art. The machine includes mechanism for thus forming the sides of the material to the core, which mechanism will now be described.

Figure 1:
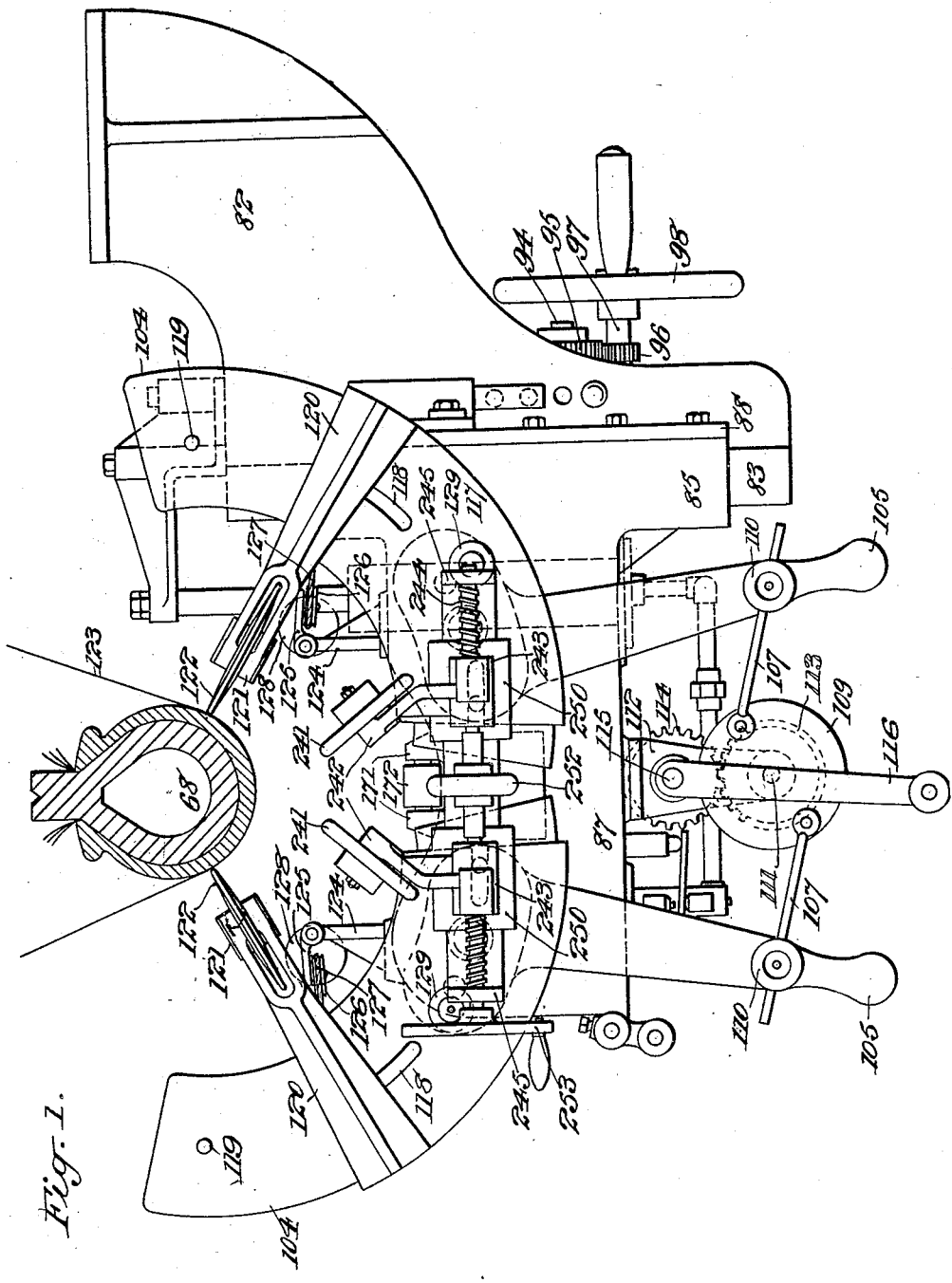

Referring to Fig. 1, a large bracket arm 82 is firmly secured to the side of the machine casing and is provided with upper and lower rails 83, 84 (Fig. 3) which are adapted to receive flanges 85, 86 that project laterally from a carriage 87 so that the latter may slide upon the rails 83, 84. A pair of gibs 88, 89 are bolted to the face of the flanges 85, 86 in order to lock the carriage 87 in position on the bracket arm 82, and the usual bearing strips 90, 91 are interposed between the parts in order to facilitate movement.

The said elements are so arranged that the sliding movement of the carriage 87 takes place in a plane parallel to the plane of rotation of the core 68, so that the said movement may be described as being radial with respect to the core. This movement is manually accomplished by means of a rack 92 which is secured to the carriage 87 and mates with a pinion 93 that is fixed on a short shaft 94 that is mounted in the bracket arm 82 and has its other end provided with a gear 95 which meshes with a pinion 96 fixed on a stub shaft 97 that is mounted in the bracket arm 82. The shaft 97 has a hand wheel 98 secured to its protruding end, and it will be clear that the rotation of this hand wheel will, through the chain of mechanism just described, slide the carriage 87 in either direction desired along the rails 83, 84 on the bracket arm 82.

Figure 2:
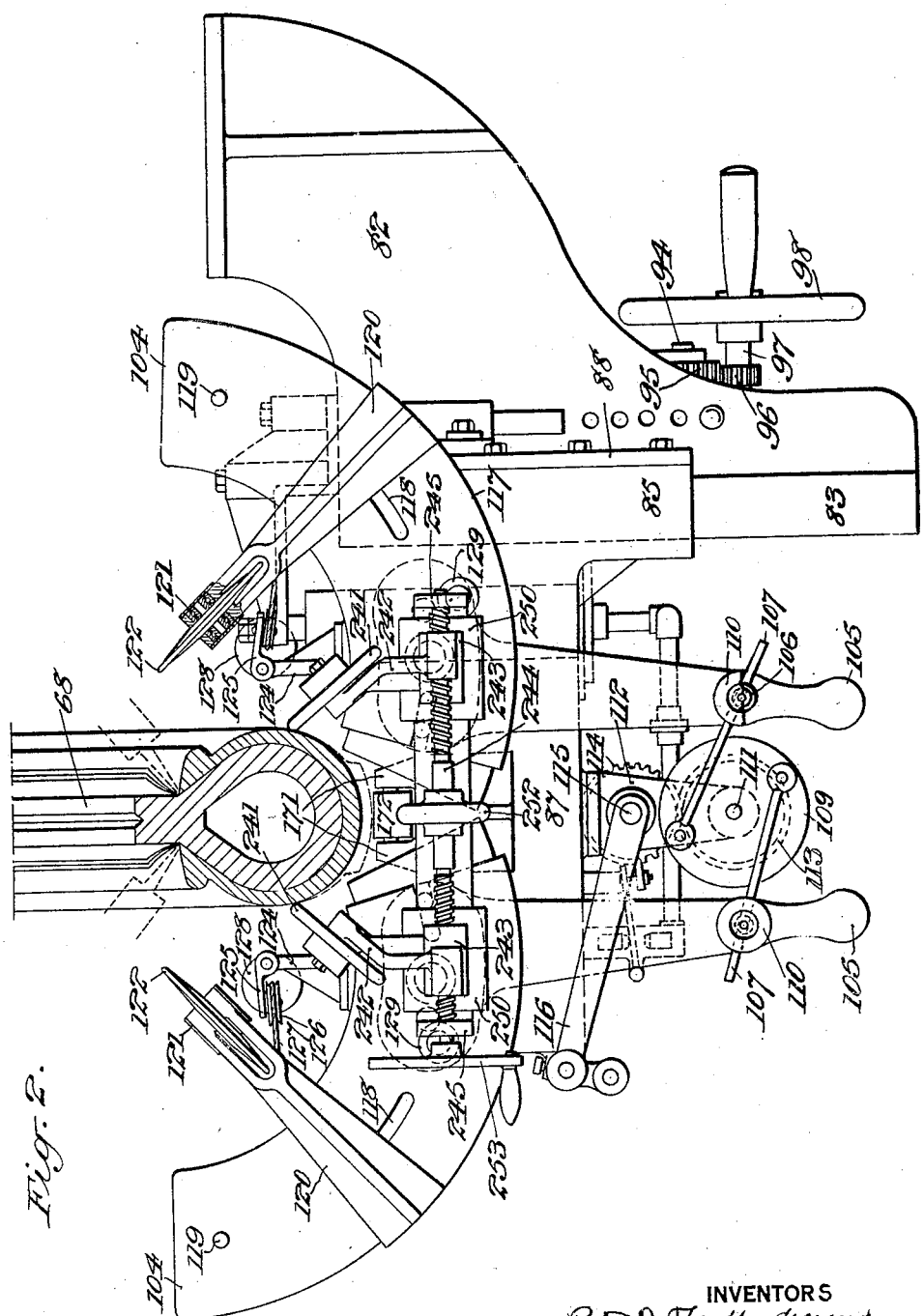
Fig. 2 represents a similar view showing certain parts in different positions.

The carriage 87 is provided with a pair of recesses 99 at the bottom of each of which is located a ball bearing, denoted in general by 100, from which uprises a sleeve 101 that fits into another ball bearing 102 located at the top of each recess. A pin 103 is supported in the said bearings within the sleeve, and its upper end protrudes above the surface of the carriage 87 and is fixed to a curved arm 104 (Fig. 2). It will be understood that there are pairs of all the parts just described so that a pair of said curved arms 104 are pivoted, one in each of said recesses 99.

Each of the curved arms 104 has a handle 105 projecting rearwardly therefrom, and each of said handles carries an apertured stud 106 fitted to receive the ends of rods 107 which have their other ends pivotally secured as shown at 108, to a disc 109. Clamping screws 110 threaded in the studs 106 serve to grip and release the rods 107 as may be desired.

The disc 109 (Fig. 3) is secured to the top of a pin 111 which has a bearing fitted in the end of a bracket 112 that is bolted to the carriage 87. The lower end of the pin 111 carries a gear 113 which meshes with another gear 114 that is carried on the lower end of a pin 115 which is also mounted in the bracket 112. The upper end of the pin 115 has a handle 116 (Fig. 1) fixed thereto. The effect of this arrangement is that manual swinging of the handle 116 will turn the gear 114 that meshes with the gear 113 and hence, rotate the disc 109. If the hand screws 110 are set so as to clamp the rods 107 to the handles 105 of the curved arms 104, this operation of the handle 116 will swing the last named arms about their pivots so that their inner curved ends will move laterally toward or away from the sides of the core 68.

The arms 104 are curved on the arc of a circle, and each one carries a similarly curved plate 117 which is adapted to slide thereon in an arcuate path. The plates 117 have slots 118 at their ends, which are adapted to impinge against pins 119 located near the ends of the arms 104 for the purpose of limiting the sliding movement of the plates 117. Each plate has secured thereto, at its outer end, a bracket 120 which projects inwardly in a lateral direction toward the core 68. The end of each bracket 120 is bifurcated and provided with a ball bearing 121 in which is rotatably mounted the hub of a disc or forming roll 122, which rolls are adapted to press the fibrous material 123 against the sides of the core and form it thereto. The operation of such forming rolls, both by hand and by machine, is quite old and well understood in the industry.

A pair of brackets 124 project inwardly from the side of the carriage 87 and carry on their ends pivot arms 125 which support pulleys 126 that are fitted to receive cords 127, each of which has one end fast to one of the curved arms 104, while the other end carries a weight 128. The action of the weights will thus be to continuously urge the curved arms 104, and hence the forming rolls 122, toward the sides of the core 68, with equal pressure at all times.

When it is desired to form down the edges of the fibrous material 123 onto the sides of the core, handles 105 of the curved arms 104 may be locked to the disc 109, as already described, after which the operator with one hand moves the handle 116 in the proper direction so as to hold the forming rolls 122 apart from each other, against the action of the weights 128, about the distance shown in Fig. 1. With the other hand, the operator turns the hand wheel 98 so as to feed the carriage 87, and parts carried thereby, inwardly toward the core until the forming rolls 122 engage the material on the core about as shown in Fig. 1. The handles 105 on the curved arms 104 may now be released by turning the screws 110 so as to permit the weights 128 to act freely upon the arms 104. With the parts in this position, and with the core rotating preferably at high speed in order to expedite the work, the operator may continue to turn the wheel 98 and thereby feed the forming rolls 122 inwardly along the sides of the core until they have formed the loose edges of the material 123 thereto. In Fig. 1, we have shown a tire partially made on the core 68, and an additional layer of material being placed thereon, and it will be understood that the operation on each layer of material is the same except that the first few layers do not pass around the beads of the tire. The machine is adapted to completely form down all the layers of material whether they are to lie under or over the tire beads, this capacity for forming the layers over the beads being due to the curved shape and arrangement of the arms 104 and parts carried thereby, as fully shown, described and claimed in said United States Letters Patent No. 1,119,326. This operation need not, therefore, be fully described herein, but it may be mentioned that the position of the forming rolls 122 when forming the material along the bottom of the tire beads is shown in dotted lines in Fig. 2, this change of angle being accomplished by sliding the plates 117 on the arms 104 and locking them in the desired position by means of clamping screws 129 which are threaded into the plates 117 and adapted to bear against the arms 104.

After the said layer of material has been completely formed on the core or on the partially formed tire, as the case may be, the carriage 87 should be retracted in order to repeat the operation upon the next layer of material, and, as this movement of retraction does not involve any active step in the manufacture of the tire, it is permissible to perform the same as quickly as possible and thereby economize time and reduce the cost of production. To this end, we provide means for automatically retracting the said carriage and parts mounted thereon, which means are fully shown and described in said co-pending application Serial No. 612,553, Patent No. 1,721,842, and which will not be described herein as they constitute no part of the invention herein claimed.

In order to prevent any portion of the carriage 87 from contacting with and injuring the partly formed tire on the core as the result of an excessive inward movement of the carriage, we provide the same with a pair of arms 171 (Fig. 2) which support between them a roll 172 that is in line with the central plane of rotation of the core, which roll may contact with the partly finished tire on the core without causing any injury thereto.

After the fibrous material, together with the tire beads, has been placed and formed on the core, a strip of rubber constituting the tread is applied to the periphery either by hand, or by suitable apparatus such, for instance, as that shown and described in said co-pending application Serial No. 612,553, Patent No. 1,721,842. The said tread strip should be pressed down upon and caused firmly to conform and adhere to the fibrous part of the tire.

Our machine includes mechanism for performing this function, which is shown in Figs. 1 to 4 inclusive, and includes a pair of disc rollers 241 that are rotatably mounted at the ends of arms 242, which arms project from hubs 243 that are mounted on oppositely threaded portions of a shaft 244 which is journaled in the ends 245 of a T-arm 246 which uprises from the carriage 87. The engagement between each of the hubs and its threaded portion of the shaft is clearly shown in Fig. 4, and consists, in each case, of a spiral spring 247 that meshes with the thread on the shaft 244 and is held in position in the hub by a nut 248 and a screw collar 249. The hubs 243 are formed integral with blocks 250 which embrace and are designed to slide upon a track 251 which is carried by the said ends 245 of the T-arm 246. A hand wheel 252 is centrally located on and fixed to the shaft 244, while a second hand wheel 253 is fast to one end thereof. The elements are so arranged that the rotation of the shaft 244 by either of the hand wheels just named will cause the hubs 243 to move axially along the shaft and thereby to move the disc rollers 241 toward or away from each other. In the operation of this mechanism after the tread strip has been wound around the periphery of the tire, the carriage 87 is moved radially toward the tire by operating the hand wheel 98, as previously described, while the disc rollers 241 are adjacent to each other, as indicated in Fig. 1. At this juncture, the workman slowly rotates the shaft 244 so as to cause the disc rollers 241 to slowly separate, while at the same time continuing the rotation of the hand wheel 98 in order to feed the carriage 87, and hence the rollers 241, radially inwardly with respect to the tire. This actuation of the parts causes the said disc rollers to move both radially and laterally with respect to the tire and thereby to traverse the surface of the tread strip and bring it into firm union with respect to the remainder of the tire. The tire tread as thus applied is shown in dotted lines in Fig. 2.

As the general operation of making automobile tires, both by hand and by machine, is so well understood in the art, and as the operation of the mechanism embodying our invention has been set forth in connection with the detail description of the mechanism, we do not consider it necessary to describe at length the operation thereof.

Various changes may be resorted to in the form, construction, and arrangement of the several parts without departing from the spirit and scope of our invention, so that we do not intend to be limited to the details herein shown and described except as the same may be included in the claims.

What we claim is:

1. In an apparatus of the character described, tire forming mechanism including, a support, a pair of arms pivoted on said support, another pair of arms slidable on said support and located between the pivoted arms, a pair of fabric forming elements mounted on said pivoted arms for angular movement with respect to the plane of core rotation, and a pair of tread forming elements mounted on said slidable arms for lateral movement with respect to the plane of core rotation.

2. In an apparatus of the character described, tire forming mechanism including, a support, a pair of arms pivoted on said support, another pair of arms slidable on said support and located between the pivoted arms, a pair of fabric forming elements mounted on said pivoted arms for angular movement with respect to the plane of core rotation, and a pair of tread forming elements mounted on said slidable arms for lateral movement with respect to the plane of core rotation, said fabric forming elements lying in advance of said tread forming elements with respect to the axis of the core.

3. In an apparatus of the character described, tire forming mechanism including, a support adjustable toward and from the core, fabric forming elements and tread forming elements carried by and movable with said support into operative relation to the core and independent control devices carried by the support to operate each of said elements, said fabric forming elements lying in advance of said tread forming elements with respect to the axis of the core.

In testimony, that we claim the foregoing as the joint invention of the said PETER D. THROPP, deceased, and said LESTER A. MORELAND, we have signed our names this 22nd day of December, 1928.

CHARLOTTE M. THROPP,
*Coexecutrix of Peter D. Thropp, Deceased.*
LESTER A. MORELAND.